UNITED STATES PATENT OFFICE.

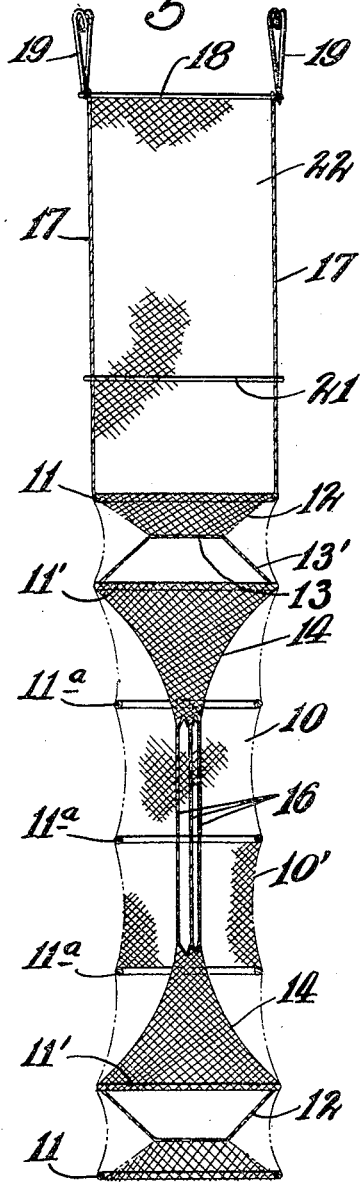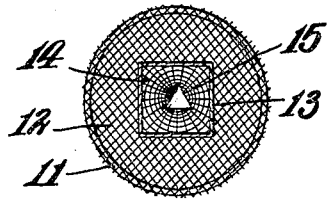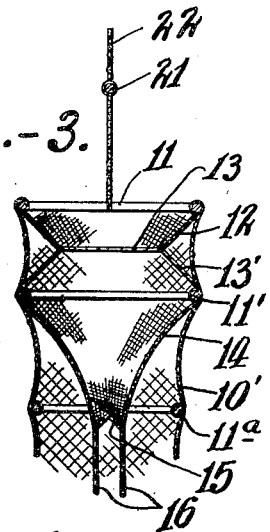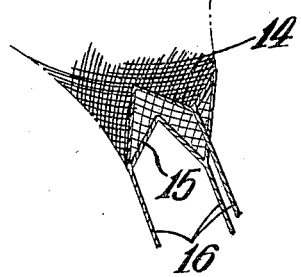

FRANK KUWIK, OF BLASDELL, NEW YORK.

FISH-TRAPPING NET.

1,381,203. Specification of Letters Patent. Patented June 14, 1921.

Application filed January 13, 1921. Serial No. 436,923.

*To all whom it may concern:*

Be it known that I, FRANK KUWIK, citizen of Poland, residing at Blasdell, in the county of Erie and State of New York, have invented certain new and useful Improvements in Fish-Trapping Nets, of which the following is a specification.

This invention relates to fishing nets, having more particular reference to nets adapted to be suspended in the water to have the fish enter therein.

The invention has for an object to provide an improved type of fishing net provided with a novel means for directing the fish into the net.

For further comprehension of the invention, and of the objects and advantages thereof, reference will be had to the following description and accompanying drawings, and to the appended claims in which the various novel features of the invention are more particularly set forth.

Figure 1 of the drawings is a vertical elevational view of a fishing net constructed according to the invention, certain of the exterior parts being broken away to show the interior construction.

Fig. 2 is a bottom plan view.

Fig. 3 is a fragmentary central vertical section at right angles to Fig. 1.

Fig. 4 is a fragmentary perspective view showing the neck of the entrance funnel.

As here shown my improved net comprises a main body 10 of generally cylindrical shape and which comprises a netting 10' made in the usual manner of the proper mesh according to the use to which the net is to be put, this netting being attached to a number of rings or hoops 11, 11' and 11ª whereby the desired cylindrical outline of the body is maintained.

This net body 10 is open at both ends to permit of entrance of the fish thereto. Extending across each end of the net body is a member 12 of netting which has an aperture 13 in its center and which inclines in a funnel-like manner into the net body, being held in this position by cords 13' secured thereto and to the adjacent rings 11'.

Secured to the rings 11' and extending toward the center of the net body are a pair of entrance funnels 14 being also formed of suitable netting, and contracting toward their inner ends to present small openings 15 at their inner ends through which the fish pass into the body of the net. To maintain these entrance funnels in proper position when the net is suspended in the water the inner ends of the funnels 14 are connected together by a series of cords 16, the lengths of these cords being arranged to hold these properly extended when the net is suspended in the water, it being understood of course that the weight of the rings 11, 11' and 11ª will act to keep the net as a whole in its proper expanded or extended position.

Secured to the top end ring 11 of the net on opposite sides thereof are a pair of cords 17 whose other ends are connected to opposite ends of a horizontal bar 18 to which may be connected the loops 19 for suspending the net.

A second bar 21 may extend between these cords a short distance above the top ring 11. Attached at opposite sides to these cords 17 and at its upper end to the cross bar 18 is a flat netting web 22 which is adapted to form a baffle or barrier whereby the fish striking thereagainst may be directed downwardly into the net body.

Fish entering the net either at the top or bottom thereof will pass through the entrance funnels into the body thereof, the small size of the necks of the funnels preventing the fish from escaping.

Having thus described my invention what I claim as new and desire to protect by Letters Patent of the United States is as follows:—

1. A fish net comprising an elongated cylindrical body made up of a netting secured upon a series of rings, entrance funnels leading into the said body from opposite ends thereof, means connecting the inner ends of said funnels to one another, a flat web of netting connected to one end of said body and diametrically intersecting the opening into the adjacent entrance funnel.

2. A fish net comprising an elongated cylindrical body made up of a netting secured upon a series of rings, an entrance funnel leading into said net, and a flat web of netting extending longitudinally from the outer end of said entrance funnel and diametrically intersecting the opening into said entrance funnel.

3. A fish net comprising an elongated cylindrical body made up of a netting secured upon a series of rings, entrance funnels leading into said net from upper and lower ends thereof, cords extending between the inner ends of said entrance funnels and maintaining the latter in position, a pair of cords extending upwardly from opposite sides of the upper one of said rings, a cross bar to which the upper ends of said cords are attached, a netting web extending across the space between the last mentioned ropes, and suspension means for the net secured to the said cross bar.

In testimony whereof I have affixed my signature.

FRANK KUWIK.